March 4, 1969 R. B. BARBER 3,430,537
OSCILLATING PISTON METER
Filed Dec. 8, 1966
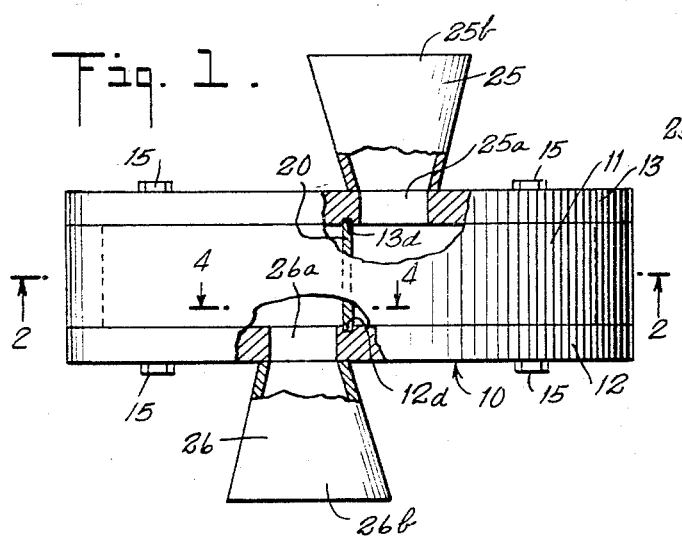
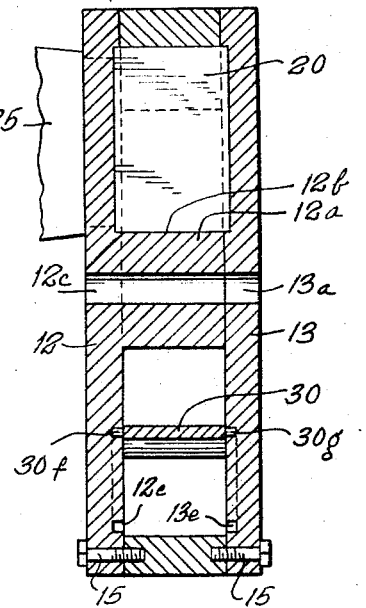
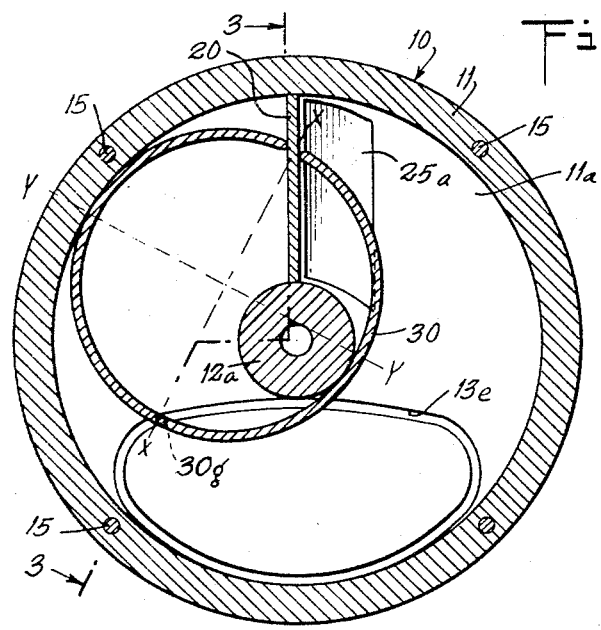
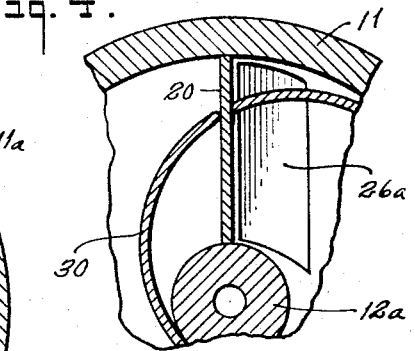
INVENTOR.
RONALD B. BARBER
BY Lester W. Clark
ATTORNEY United States Patent Office 3,430,537
Patented Mar. 4, 1969

3,430,537
OSCILLATING PISTON METER
Ronald B. Barber, Cheshire, Conn., assignor to Neptune Meter Company, New York, N.Y., a corporation of New Jersey
Filed Dec. 8, 1966, Ser. No. 600,167
U.S. Cl. 91—56    5 Claims
Int. Cl. F01c *1/00, 3/00;* G01f *3/08*

ABSTRACT OF THE DISCLOSURE

A fluid meter of the oscillating piston type, including a circularly cylindrical chamber, a circularly cylindrical hub at the center of the chamber, inlet and outlet ports in one or both ends of the chamber, a flow divider separating the inlet and outlet ports and extending between the hub and the chamber wall, a circularly cylindrical piston completely open from end to end and encircling the hub, the piston being slotted from end to end to receive the flow divider, and guide means for the piston, such as pins projecting from both ends thereof and traveling in grooves in both ends of the chamber, the grooves being contoured to maintain the inner surface of the piston in contact with the hub at all positions of the piston, and to maintain the outer surface of the piston in contact with the inner wall of the chamber at all positions of the piston.

---

This invention relates to meters, and more particularly relates to improvements in fluid flow metering devices of the oscillating piston type.

Oscillating piston meters comprise an open cylindrical piston enclosed within a cylindrical chamber having a greater diameter than the diameter of the piston. The piston is free to rotate eccentrically so that as it rotates a first moving seal is formed where the piston's outer periphery contacts the inner periphery of the chamber, and a second moving seal is formed where the piston's inner periphery contacts the outer periphery of a centrally located hub. In such a meter, the fluid enters at an inlet side of the piston to push it around, and in so doing, forces the fluid on the outlet side of the piston out of the chamber. The inlet and outlet ports are divided by a flow division member, and the piston is slotted to straddle and oscillate upon the flow division member. In actual practice, the pressure drop, accuracy, and life characteristics of such meters are less than completely satisfactory.

The aforesaid inner and outer piston seals have individually varying velocities of movement during a piston cycle, and for all meters heretofore constructed their average velocities are appreciably less than the average velocity of fluid flow through the meter, during a piston cycle. This condition results in pressure drop which is excessive and which varies during the piston cycle, both of which affect meter accuracy. This condition also causes excessive leakage past the seals, thus also decreasing meter accuracy.

It is therefore highly desirable to design a meter in which the piston seals travel at an average rate which is more nearly equal to the speed of the fluid than has been heretofore known, so as to reduce pressure drop and leakage due to this source. It is also desirable to reduce the variation in pressure drop and leakage within the piston cycle, as distinct from the average values thereof, particularly to increase the accuracy of partial cycles where averaging cannot be effective.

It is an object of the present invention to provide an improved meter of the type described.

Another object of the invention is to provide such a meter wherein the average piston seal speeds are closer to the average fluid speeds in the meter than heretofore, thereby reducing pressure drop and leakage.

Another object of the invention is to provide such a meter having improved accuracy due to decrease in pressure drop and leakage.

Another object of the invention is to provide a reduction in the variation in pressure drop and leakage within the piston cycle.

These and other objects and advantages of the invention will be more fully understood as a detailed description of a presently preferred but merely illustrative embodiment of the inventive principles is hereinafter set forth, with reference to the drawings, wherein:

FIG. 1 is a plan view of a meter according to the invention partially broken away to show certain internal details of construction;

FIG. 2 is an elevational section view of the meter shown in FIG. 1 taken along plane 2—2 therein and showing the piston in one position;

FIG. 3 is a section view of the meter shown in FIG. 2 taken along plane 3—3 therein;

FIG. 4 is a detailed view of a portion of the internal parts of the meter shown in FIG. 2 showing the piston in another position; and FIG. 5 is a perspective view of the piston employed in the meter of FIGS. 1–4.

Briefly, it has been found that the ratio of the stroke of the piston to the piston diameter determines the relationship between the average velocity of the piston seals to the average velocity of the fluid. Typical meters presently known to the art have stroke to piston diameter ratios on the order of 0.3. In prior art meters such low ratios were employed because with higher ratios the piston cannot maintain both seals throughout the piston cycle, and because the effect of the ratio on performance was not fully appreciated. The present invention provides a meter having a piston with a diameter and a stroke such that the ratio of the piston stroke to diameter is much closer to 1.0 than has heretofore been known, yet which is capable of maintaining both seals throughout the piston cycle.

Referring now to the figures, there is shown a meter indicated generally at 10 comprising a housing 11 including an internal cylindrical cavity 11a therethrough, closed by a pair of generally plate-shaped housing covers 12, 13. Covers 12, 13 are secured by four bolts 15 which pass through cover 12, and another four bolts 15 which pass through cover 13, to threadedly engage housing 11.

Cavity 11a surrounds a concentric hub 12a comprising a cylindrical boss 12b on the inner face of cover 12, having a longitudinal length equal to the distance between covers 12, 13 when the meter is assembled as shown. When the parts are in their assembled condition the hub 12a rests tightly against the cover 13. Centrally located within hub 12a is a longitudinal aperture 12c which communicates with a corresponding aperture 13a in cover 13 to provide an aperture entirely through the central hub 12a of the meter for mounting or other purposes.

A flow division member 20, in the form of a diaphragm or web, is provided for the usual purpose of separating input from output portions of the meter. As is best seen in FIGS. 1 and 3, diaphragm 20 is received in slots 12d, 13d in covers 12, 13, and tightly abuts the inner surface of housing 11 at an upper extreme of diaphragm 20 and the outer surface of hub 12a at a lower extreme of diaphragm 20. Diaphragm 20 is thus radially located with respect to hub 12a. If desired, slots may be employed in the inner surface of housing 11 and the outer surface of hub 12a to receive the respective upper and lower extreme edges of diaphragm 20, but it has been found that such slots are not usually necessary when slots 12d, 13d are employed.

Cover 13 includes a port 25 having a generally rectangular throat 25a located immediately adjacent and to the right of diaphragm 20 as viewed in FIGS. 1–3. Leading outwardly from throat 25a is a port conduit 25b, which is generally rectangular and of outwardly increasing cross-sectional area. Cover 12 similar includes a port 26 having a generally rectangular throat 26a located immediately adjacent and to the left of diaphragm 20, as viewed in FIG. 1. The configuration of port conduit 26b and the configuration of throat 26a are the same as that shown and described with reference to port 25.

A piston 30, which may be seen in perspective in FIG. 5, is carried within the cavity 11a of housing 11 and comprises a thin walled cylindrical section which forms an incomplete ring having opposed free ends 30a, 30b thereof defining a narrow gap 30c. The longitudinal dimension of piston 30 is sufficient so that a close fitting but slidable relationship between its peripheral end edges 30d, 30e, i.e. its rims, and the facing surfaces of covers 12, 13 is established. The gap 30c of piston 30 is occupied by the diaphragm 20 so that the rounded free ends 30a, 30b slidably contacting the opposite faces of diaphragm 20, and the hub 12a is thereby included within the interior of piston 30.

As may be seen in FIGS. 1, 2 and 5, at the portion of peripheral end edges 30d, 30e of piston 30 diametrically opposite to gap 30c is located a pair of pins 30f, 30g respectively. A single pin, i.e. either 30f, or 30g, can be employed if desired. Pins 30f, 30g project longitudinally outwardly of the piston 30, i.e. they project normally outwardly from rim edges 30d, 30e. In each of covers 12, 13, at the lower portions thereof, there is disposed an inwardly facing groove 12e, 13e respectively, each of which describes a closed curve, the two closed curves being identically located at all points thereof with reference to the perimeter of cavity 11a. The closed curve which grooves 12e, 13e describe is one where any point of the periphery thereof which is occupied by the pins 30f, 30g will correspond to a geometric relationship between the hub 12a, the housing 11, and the piston 30 so that a seal will exist between the inner surface of the piston 30 and the outer surface of the hub 12a and another seal will exist between the outer surface of piston 30 and the inner surface of housing 11. Thus the grooves 12e, 13e are the locus of all points traced by pins 30f, 30g during a piston cycle with both said seals constantly established. Therefore, the grooves 12e, 13e will constrain the pins 30f, 30g, and accordingly the piston 30, to maintain the double seal contact with hub 12a and housing 11 throughout the piston cycle despite the greatly decreased diameter of piston 30 which would otherwise cause it to fall away from such contact, breaking at least one of said seals.

Pins 30f, 30g can be carried on portions of piston 30 other than diametrically opposite to gap 30c as shown in the figures, and alternatively ball bearings or other devices can be employed instead of pins. Further, it is not necessary, although it is desirable, for both pins to be located on the same portion of the periphery of piston 30. Finally, it is not necessary that the closed-curved groove be located as shown in the illustrated embodiment. It is necessary however that means be provided for constraining piston 30 for movement so that both seals are maintained throughout a piston cycle.

If the pins 30f, 30g, or similar devices, are located on points on the edges 30d, 30e other than diametrically opposite to the gap 30c as illustrated, the grooves 12e, 13e will have to be located other than as shown, to meet the necessary condition that they include the locus of all points described by their pins during a piston cycle with both seals constantly established. When the pins are located diametrically opposite the gap 30c, which is preferred, the grooves 12e, 13e will describe symmetrical curves bisected by the diametrical plane through the middle of diaphragm 20, as illustrated. This relationship gives the best control over the path of piston 30 so that the two seals are most easily maintained with the least stress and wear on pins 30f, 30g and grooves 12e, 13e. When the pins are moved to the left or right (as viewed in FIG. 2) of the illustrated position opposite to gap 30c, the grooves 12e, 13e will be asymmetrical and moved toward the left or right of the diametrical plane including diaphragm 20.

A diameter $x$—$x$ is shown in FIG. 2 connecting the center of gap 30c and the center of pin 30f. A diameter $y$—$y$ is also shown, and is perpendicular to diameter $x$—$x$. Diameter $y$—$y$ divides piston 30 into a first semicylindrical portion bisected by gap 30c, and a second semicylindrical portion including pins 30f, 30g. Grooves 12e, 13e must lie outside of hub 12a, and accordingly the pins 30f, 30g, (or equivalent means) are mounted within the said second semicylindrical portion, and preferably on the rim as aforesaid. In this event the grooves 12e, 13e, although skewed to the left or right as explained above, will not cross hub 12a. As aforesaid, the preferred position for pins 30f, 30g is as shown, diametrically opposite to gap 30a, so that the grooves 12e, 13e are symmetrical with respect to the plane of diaphragm 20.

Either of ports 25, 26 can be employed as the input port with the other being employed as the output port. When fluid is passed into the input port the piston will begin to cycle and will force fluid out of the output port. In general the operation of the meter 10 proceeds in the usual manner for such a class of meters, and need not be described further. The stroke of the piston is, in the meter shown, the distance along diaphragm 20 from the wall of housing cavity 11a to hub 12a. In the illustrated embodiment this is about 0.67 of the piston diameter, compared to about 0.3 in prior art meters. Since there must be a hub 12a, the piston stroke cannot equal the piston diameter, but the ratio can be much improved, as aforesaid. Because of the much higher ratio of piston stroke to piston diameter afforded by the present invention, the average speed of the two piston seals is much faster and therefore much closer to the speed of the fluid through the meter, than was heretofore possible. This results in a much lower pressure drop and much less fluid leakage past the seals, both of which contribute directly to meter accuracy. It also attenuates the variation in what pressure drop remains, thus rendering partial cycles more accurate. The degree of improvement of meter accuracy, and particularly the degree of improvement in pressure drop and leakage contributed by the present invention, is far more than a refinement of prior art characteristics, and constitutes instead an important and distinct advance thereover.

The cycles of piston 30 can be counted by providing a magnetic body (not shown) in the rim thereof, e.g. at one of the pins 30f, 30g, and further providing a magnetically sensitive coil (not shown) imbedded in or in proximity to a portion of one of covers 12, 13 opposite to one of grooves 12e, 13e. Each cycle of piston 30 will register at such a coil, and the signal produced thereby can be correlated to flow rate or total flow. Other expedients may also be employed.

The invention has been described with reference to a presently preferred, but merely illustrative embodiment. Many variations in form and arrangement of parts may be made without departing from the essential teachings of the invention.

What is claimed is:

1. A fluid meter of the oscillating piston type, comprising:

(a) means defining a measuring chamber including a cylindrical peripheral wall and end closure means at both ends of the wall, said closure means having inlet and outlet ports, a center member within said chamber and concentric with said wall, and a flow division member extending from said center member to said wall and separating said inlet and outlet ports (b) a uniformly thin walled cylindrical piston completely open from end to end, said piston encircling said center member and having a slot extending from one end to the other and slidably receiving said flow division member, said piston having an inside diameter greater than twice the diameter of the center member, so that the center of said piston lies outside said center member when the piston periphery contacts the wall of said chamber; and means for guiding said piston during oscillation, including a guide member projecting from one end edge of said piston and a path defining groove receiving said guide member and formed in the end closure means adjacent said guide member, said path defining groove being contoured so that during oscillation of the piston, contact is continuously maintained between the piston outer periphery and said chamber wall, and contact is continuously maintained between the piston inner periphery and said center member.

2. A fluid meter according to claim 1, wherein said chamber peripheral wall, the outer and inner peripheral surfaces of said piston, and the peripheral surface of said center member, are all circularly cylindrical.

3. A fluid meter according to claim 2, wherein, said circular cylindrical piston includes first and second semicylindrical portions, said slot being located at the middle of said first portions, said guide member is located at the rim of said piston within said second semicylindrical portion, and said path defining groove describes a closed curve including the locus of all points occupied by said guide member as said piston oscillates with said inner and outer contacts continuously maintained, said guide member being constrained by said path defining groove to follow said closed curve.

4. A fluid meter according to claim 3, wherein, said guide member is located diametrically opposite to said slot in said piston.

5. A fluid meter according to claim 4, in which said piston guiding means comprises:

(a) two aligned guide members projecting from opposite ends of the piston; and
(b) two path defining grooves receiving the respective guide members and formed in the two ends of the chamber defining means.

References Cited

UNITED STATES PATENTS

| 300,627 | 6/1884 | Nash | 73—257 |
|---|---|---|---|
| 300,630 | 6/1884 | Nash | 91—56 |
| 1,777,806 | 10/1930 | Nichols | 73—257 X |
| 1,973,670 | 9/1934 | Star | 91—56 |
| 1,999,684 | 4/1935 | Bradley | 73—257 |
| 2,338,152 | 1/1944 | Whittaker | 91—56 |
| 2,399,856 | 5/1946 | Coger | 73—257 |
| 2,449,974 | 9/1948 | Bergman | 91—56 |
| 2,462,063 | 2/1949 | Bergman | 91—56 |
| 2,561,280 | 7/1951 | Kampf | 73—257 X |

MARTIN P. SCHWADRON, *Primary Examiner.*

IRWIN C. COHEN, *Assistant Examiner.*

U.S. Cl. X.R.

73—257